(12) United States Patent
Person

(10) Patent No.: US 10,386,000 B2
(45) Date of Patent: Aug. 20, 2019

(54) PIPE CONNECTOR FOR CONNECTING TWO PIPE SECTIONS

(71) Applicant: Mahle International GmbH, Stuttgart (DE)

(72) Inventor: Eddy Person, Guignicourt sur Vence (FR)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/950,920

(22) Filed: Apr. 11, 2018

(65) Prior Publication Data

US 2018/0299054 A1 Oct. 18, 2018

(30) Foreign Application Priority Data

Apr. 12, 2017 (EP) .................................... 17166373

(51) Int. Cl.
| | |
|---|---|
| *F28F 9/02* | (2006.01) |
| *F16L 37/14* | (2006.01) |
| *F16L 37/12* | (2006.01) |
| *F16L 23/04* | (2006.01) |
| *F16L 25/06* | (2006.01) |

(52) U.S. Cl.
CPC ............ *F16L 37/144* (2013.01); *F16L 23/04* (2013.01); *F16L 25/06* (2013.01); *F16L 37/1225* (2013.01); *F28F 9/0248* (2013.01); *F28F 9/0258* (2013.01); *F16L 2201/00* (2013.01)

(58) Field of Classification Search
CPC ... F16L 23/003; F16L 23/006; F16L 23/0286; F16L 23/036; F28F 9/12; F28F 2009/0285; F28F 9/0248; F28F 9/00
USPC .................................. 285/205, 305, 320, 921
See application file for complete search history.

(56) References Cited

U.S. PATENT DOCUMENTS

| | | | | |
|---|---|---|---|---|
| 5,234,185 A | * | 8/1993 | Hoffman ................... | F16L 5/14 248/56 |
| 7,014,225 B1 | * | 3/2006 | Goodsel .................. | F16L 23/04 285/363 |
| 7,052,051 B2 | * | 5/2006 | Gaffe ....................... | F16L 37/12 285/124.1 |
| 7,547,048 B2 | * | 6/2009 | Catlow ................... | F16L 37/08 285/305 |

(Continued)

FOREIGN PATENT DOCUMENTS

| | | | |
|---|---|---|---|
| EP | 0466256 A1 * | 1/1992 | ............ F16L 23/036 |
| EP | 2 006 590 A1 | 12/2008 | |

(Continued)

*Primary Examiner* — David Bochna
(74) *Attorney, Agent, or Firm* — Fishman Stewart PLLC

(57) ABSTRACT

A pipe connector may include a lower motion link and an upper motion link, which may be fastened so as to be pivotable towards each other about a pivot axis. The lower motion link may have a lower seating for one of the pipe sections, and a bearing surface for the connection flange of the first pipe section. The upper motion link may have an upper seating for the other of the pipe sections, and a bearing surface for the connection flange of the second pipe section. The pivot axis may be aligned substantially at right angles to an axial direction of the lower seating and of the upper seating for the pipe sections. In a closed state, the bearing surfaces may be facing each other so that the connection flanges of both pipe sections may be able to be clasped.

20 Claims, 3 Drawing Sheets

(56) References Cited

U.S. PATENT DOCUMENTS

| | | | | |
|---|---|---|---|---|
| 7,604,258 B2* | 10/2009 | Getto | ............... | F28F 9/0246 |
| | | | | 285/124.2 |
| 7,637,538 B2* | 12/2009 | Tchang | ............... | F28F 9/0246 |
| | | | | 285/124.3 |
| 7,640,603 B2* | 1/2010 | Robertson | ............... | E03D 1/34 |
| | | | | 285/205 |
| 8,075,022 B2* | 12/2011 | Blassmann | ............... | F16L 37/12 |
| | | | | 285/124.4 |
| 9,114,687 B2* | 8/2015 | Dorland | ............... | F25B 41/062 |
| 9,562,634 B2* | 2/2017 | Hoehn | ............... | F16L 21/08 |
| 10,001,227 B2* | 6/2018 | Basesme | ............... | F16L 3/237 |
| 10,106,111 B2* | 10/2018 | Hoffmann | ............... | F16L 3/237 |
| 2004/0075274 A1 | 4/2004 | Szabo et al. | | |
| 2005/0110273 A1* | 5/2005 | Vincent | ............... | F16L 37/1225 |
| | | | | 285/305 |

FOREIGN PATENT DOCUMENTS

| | | | | |
|---|---|---|---|---|
| EP | 2 988 047 A1 | 2/2016 | | |
| WO | 2006/037404 A1 | 4/2006 | | |
| WO | 2007/063390 A1 | 6/2007 | | |
| WO | WO-2010089065 A1 * | 8/2010 | ............ | F16L 23/036 |
| WO | WO-2016200042 A1 * | 12/2016 | ............ | F28F 9/00 |

* cited by examiner

PIPE CONNECTOR FOR CONNECTING TWO PIPE SECTIONS

CROSS-REFERENCE TO RELATED APPLICATIONS

This application claims priority to European Patent Application No. EP 17166373.5, filed on Apr. 12, 2017, the contents of which are incorporated herein by reference in its entirety.

TECHNICAL FIELD

The invention relates to a pipe connector for connecting a first pipe section and a second pipe section, each of which has a connecting flange. The invention further relates to a pipe connection using such a pipe connector. Additionally, the invention relates to a heat exchanger with at least one such pipe connection.

BACKGROUND

Such pipe connectors are known from the prior art for fastening pipe sections that are inserted into each other. The pipe connectors typically have two legs, which are fastened at a hinge so as to be pivotable towards each other about a pivot axis that extends parallel to a plug-in direction, in which the two pipe sections are inserted into each other. At the same time, each of the legs clasps the connecting flanges of both pipe sections, so that the pipe sections are retained firmly. Thus, the legs and the flanges form a kind of wedge gear, by means of which an axial retaining force may be achieved. The two legs must be fastened to each other to ensure that the pipe connection does not fall apart on its own.

It has been found that if the two legs are not firmly fixed to one another, the pipe connection may separate during operation because of vibration. In such cases, the problem is that it is possible that the pipe connection may initially remain firm during a leak test, and it is not evident that the pipe connector has been assembled incorrectly.

SUMMARY

The object underlying the present invention is to provide an improved or at least a different embodiment of a pipe connector, which is characterised particularly in that its incorrect assembly is readily evident.

This object is solved according to the invention with the subject matter of the independent claims. Advantageous refinements are the subject matter of the dependent claims.

The invention is based on the general idea of designing the pipe connector in such manner that the connection comes apart, in a pressure test for example, if the pipe connector has not been assembled properly. This is achieved for example if the pivot axis is aligned substantially at right angles to an axial direction of the pipe sections, or at right angles to the plug-in direction. According to the invention, It is therefore provided that the pipe connector has a lower motion link and an upper motion link, which are held together in such manner as to be pivotable about a pivot axis, that the lower motion link has a seating for one of the pipe sections, that the lower motion link has a bearing surface for the connection flange of the first pipe section, that the upper motion link has an upper seating for the other pipe section, that the upper motion link has a bearing surface for the connection flange of the second pipe section, that the pivot axis is aligned substantially at right angles to an axial direction of the pipe section, and that in a closed state the bearing surface of the lower motion link faces the bearing surface of the upper motion link, so that the connection flanges of the two pipe sections can be clasped. Since the pivot axis is aligned transversely to the plug-in direction, the upper motion link folds away upwards when the pipe connector is opened. Consequently, the pipe connector can only exert very minor axial forces, or none at all, when the pipe connector is not closed, that is to say the upper motion link is not fastened to the lower motion link. As a result, an incorrectly assembled pipe connector would be evident in a pressure test.

The expression "closed state" of the pipe connector is understood to mean that the upper motion link is folded towards the lower motion link, so that the lower motion link and the upper motion link lie flush against each other.

Of course, the connection flanges may each be designed as protruding circumferential collars or annular beads. One of the connection flanges is preferably designed as a protruding circumferential collar, and the other connection flange as an annular bead.

Of course, a pipe section may either be part of a pipe, particularly an end section of a pipe. Similarly, a pipe section may also be a pipe union of a housing. The pipe sections are expediently equipped such that they can be inserted in each other to enable fluid communication between the pipe sections.

In the description and the attached claims the terms "substantially at right angle" and "substantially in parallel" mean a deviation form "at right angle" or "in parallel" respectively up to 5°.

A favourable option provides that the lower motion link has one base section and two legs, which delimit the lower seating on three sides, and that the upper motion link has one base section and two legs which delimit the upper seating on three sides. In this way, both the upper motion link and the lower motion link each form a substantially U-shaped element or a U-shaped seating, in which the pipe sections can be accommodated. This enables the pipe connector to be fitted on the one pipe section initially. Then, the pipe connector can be closed by folding the upper motion link inwards. The U-shape of the upper motion link then enables the second pipe section to enter the upper seating when the upper motion link is folded in towards the lower motion link.

A further favourable option provides that both legs of the lower motion link include the bearing surface for the connection flange of the first pipe section, that the bearing surface for the connection flange of the first pipe section is flat. This enables the two legs to transmit an axial force to the connection flange of the first pipe section, so that the lower motion link can hold the first pipe section.

A particularly favourable option provides that the two legs of the upper motion link motion include the bearing surface for the connection flange of the second pipe section, that the bearing surface for the connection flange of the second pipe section is curved. The curved shape of the second bearing surface makes it possible to adapt to fit a connection flange which is not flat, a bead, for example. In addition, both legs of the upper motion link are also able to hold the second connection flange in the axial direction, so that both pipe sections can be held together.

An advantageous solution provides that the bearing surface of the upper motion link is designed to match a connection flange in the form of an annular bead.

A further advantageous solution provides that the upper motion link has ribs which are disposed on the ends of the two legs farthest from the pivot axis, and which extend transversely to an insertion direction of the upper seating. In this way, the ribs prevent the pipe connection from being pulled away in the insertion direction. Consequently, the pipe connector cannot be removed from the pipe sections until the upper motion link has been folded up about the pivot axis, and the ribs are no longer in a position to stop the connection flange from moving out of the seating.

A further particularly advantageous solution provides that each of the two legs of the upper motion link has a detent contour, that each of the two legs of the lower motion link has a complementary counterpart contour matching the detent contour, which engages in latching manner with the associated detent contour when the pipe connector is closed. In this way, the two motion links may be fastened to each other securely, so that the pipe connector can be closed simply. Assembly is accordingly very simple. In addition, such a detent connection cannot absorb any forces if it not closed properly, and if the detent contours are not engaged, the upper motion link can fold away to the connection is lost when a pressure test is carried out at the factory.

A favourable variant provides that the detent contour is an undercut, and the mating detent contour is a locking hook or vice versa. Detent contours and mating detent contour with this design are easily manufactured and ensure adequate fixing.

A further favourable variant provides that the lower seating has an insertion area and a retention area, that the retention area of the lower seating is in the shape of circular segment, and that the insertion area of the lower seating has a width that becomes smaller from the insertion opening towards the retention area. In particular, at its smallest point, the insertion area is thinner than the outer diameter of the associated pipe section. This also creates a kind of detent connection, which retains the lower motion link of the pipe connector against the respective pipe section.

A further particularly favourable variant provides that the upper seating has an insertion area and a retention area, that the retention area of the upper seating is in the shape of circular segment, and that the insertion area of the upper seating has a substantially constant width. In particular, the width is equal is equal to or greater than the outer diameter of the associated pipe section. This enables the upper motion link to be folded onto the lower motion link simply, and the associated pipe section can advance into the seating through the insertion area as it is folded.

An advantageous option provides that the pivot axis extends substantially at right angles to an insertion direction of the lower seating, and preferably in a plane of the flange. Since the pivot axis is aligned substantially at right angles to the insertion direction, the respective pipe section of the upper motion link can advance into the seating on the upper motion link at the same time as it pivots.

A further advantageous option provides that the pipe connector has a hinge, on which the upper motion link and the lower motion link are retained. A hinge is a simple way to hold both motion links together pivotably about the pivot axis.

A further particularly advantageous option provides that the pipe connector includes an anti-slip arrangement, which prevents the pipe connector from slipping off the pipe sections. Such an anti-slip arrangement may be assured with the previously mentioned ribs, for example. Additionally, the anti-slip arrangement may be formed by the tapering insertion area of the lower seating. The detent contours of the upper motion link preferably clasp the legs of the lower motion link from the outside, so that the legs of the lower motion link are stiffened and in turn further reinforce the securing effect of the tapering insertion area of the lower motion link.

The invention is also based on the further general idea of fitting a pipe connection having a first pipe section with a connection flange and having a second pipe section with a connection flange which lies flush against the connection flange of the first pipe section, with a pipe connector as described in the preceding description, in order to connect the two pipe sections, wherein the seating surface for the connection flange of the first pipe section lies flush against the connection flange of the first pipe section and wherein the bearing surface for the connection flange of the second pipe section lies flush against the connection flange of the second pipe section, so that the pipe connector holds both connection flanges together, and therewith also both pipe sections. In this way, the advantages of the pipe connector are transferred to the pipe connection, the description of which is herewith referenced for the present purposes.

A favourable solution provides that the connection flange of the first pipe sections is in the form of a protruding circumferential collar, and that the connection flange of the second pipe sections is in the form of an annular bead, which is preferably located at a distance from one end of the second pipe section. In this way, part of the second pipe section may engaged in the first pipe section, while the annular bead is braced against the connection flange of the first pipe section. In particular, this is a way to form a radial seal between the first pipe section and the second pipe section. Thus, the axial forces that must be applied by the pipe connector can be reduced.

The invention is further based on the general idea of equipping a heat exchanger with a pipe union and a pipe connected to the pipe union with a pipe connection according to the preceding description, so that the advantages of the pipe connection may be transferred to the heat exchanger, the description of which is herewith referenced for the present purposes.

Further important features and advantages of the invention are included in the subordinate claims, the drawings, and the associated description of the figures with reference to the drawings.

Of course, the features described in the preceding text and those that will be explained in the following are usable not only in the respective described combinations thereof, but also in other combinations or alone without departing from the scope of the present invention.

Preferred embodiments of the invention are represented in the drawings and explained in greater detail in the following description, wherein the same reference signs refer to identical or similar or functionally equivalent components.

DETAILED DESCRIPTION

Figure 1:
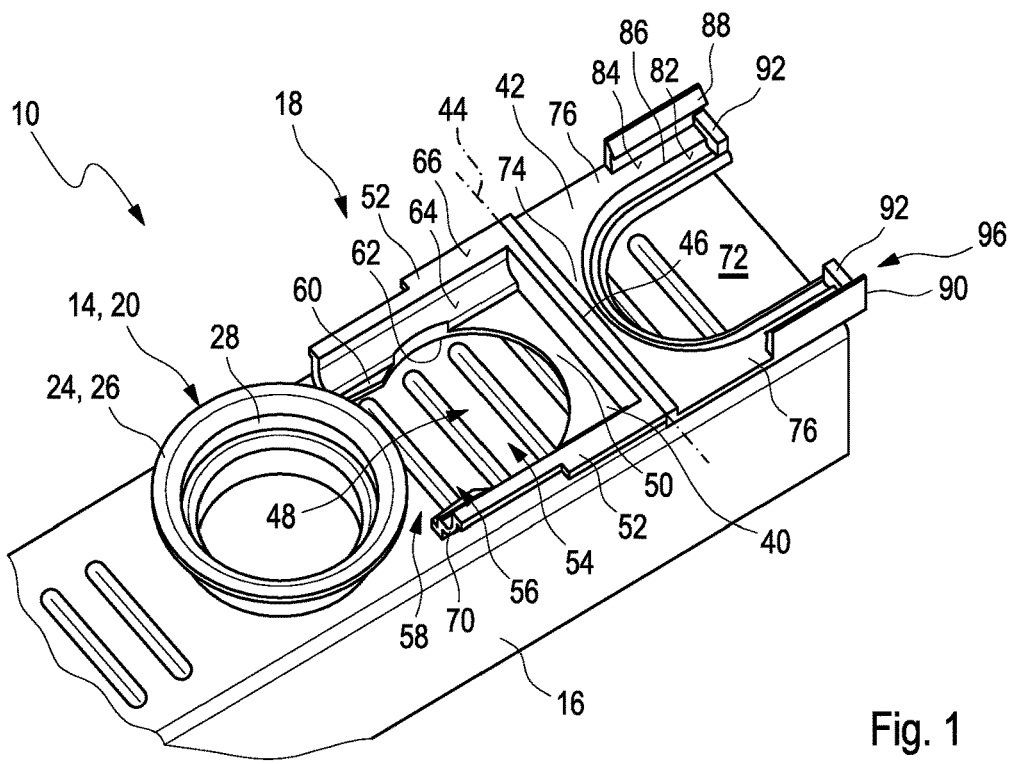
FIG. 1 a perspective view of an open pipe connector.
Figure 2:
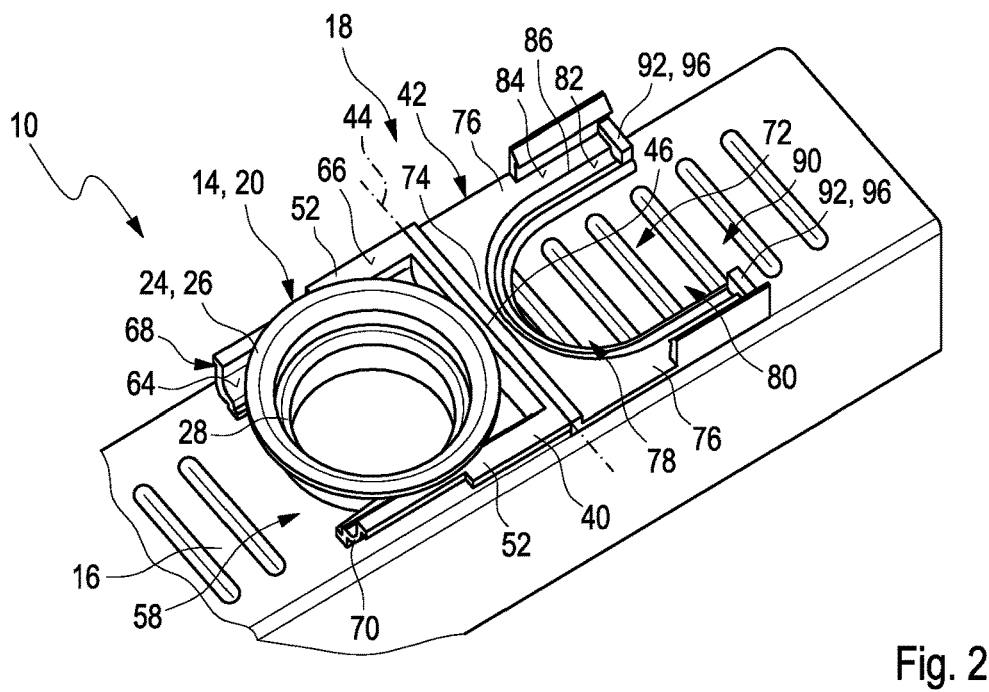
FIG. 2 a perspective view of the open pipe connector, wherein a lower motion link is placed on a first pipe section, FIG. 3 a representation corresponding to FIG. 2, wherein a second pipe section is inserted in the first pipe section, FIG. 4 a representation corresponding to FIG. 3, wherein the pipe connector is closed, and FIG. 5 a longitudinal cross section through a pipe connection.
Figure 3:
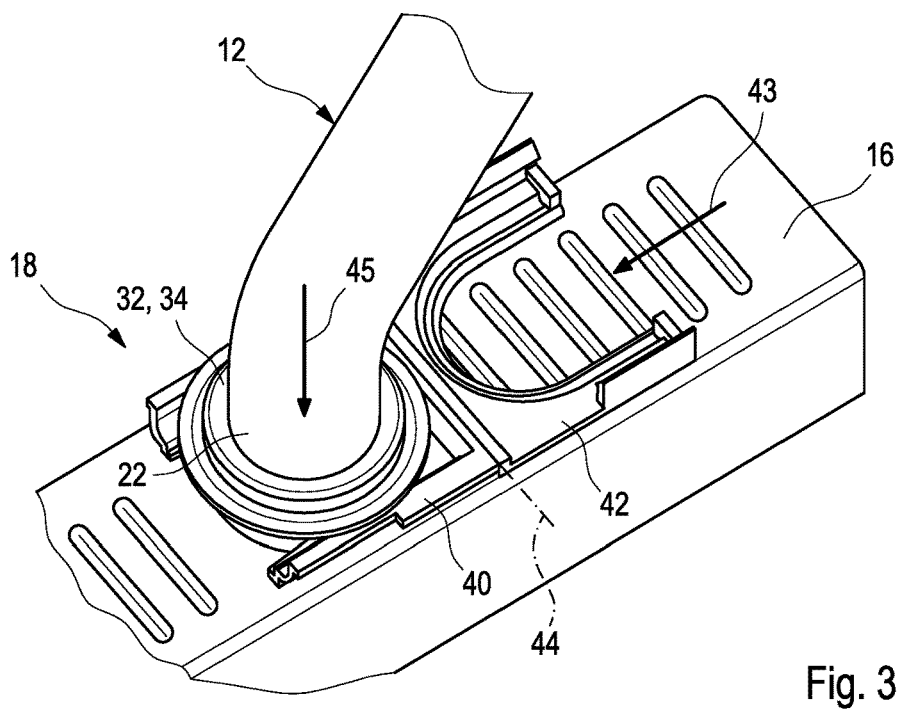
Figure 4:
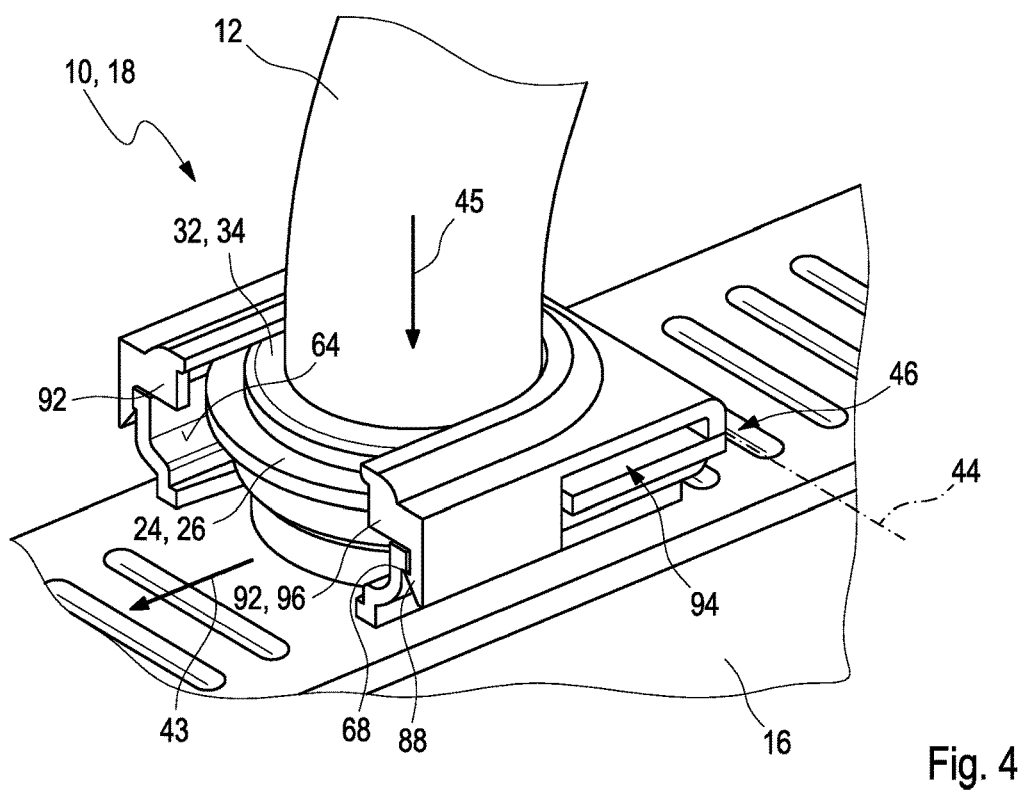
Figure 5:
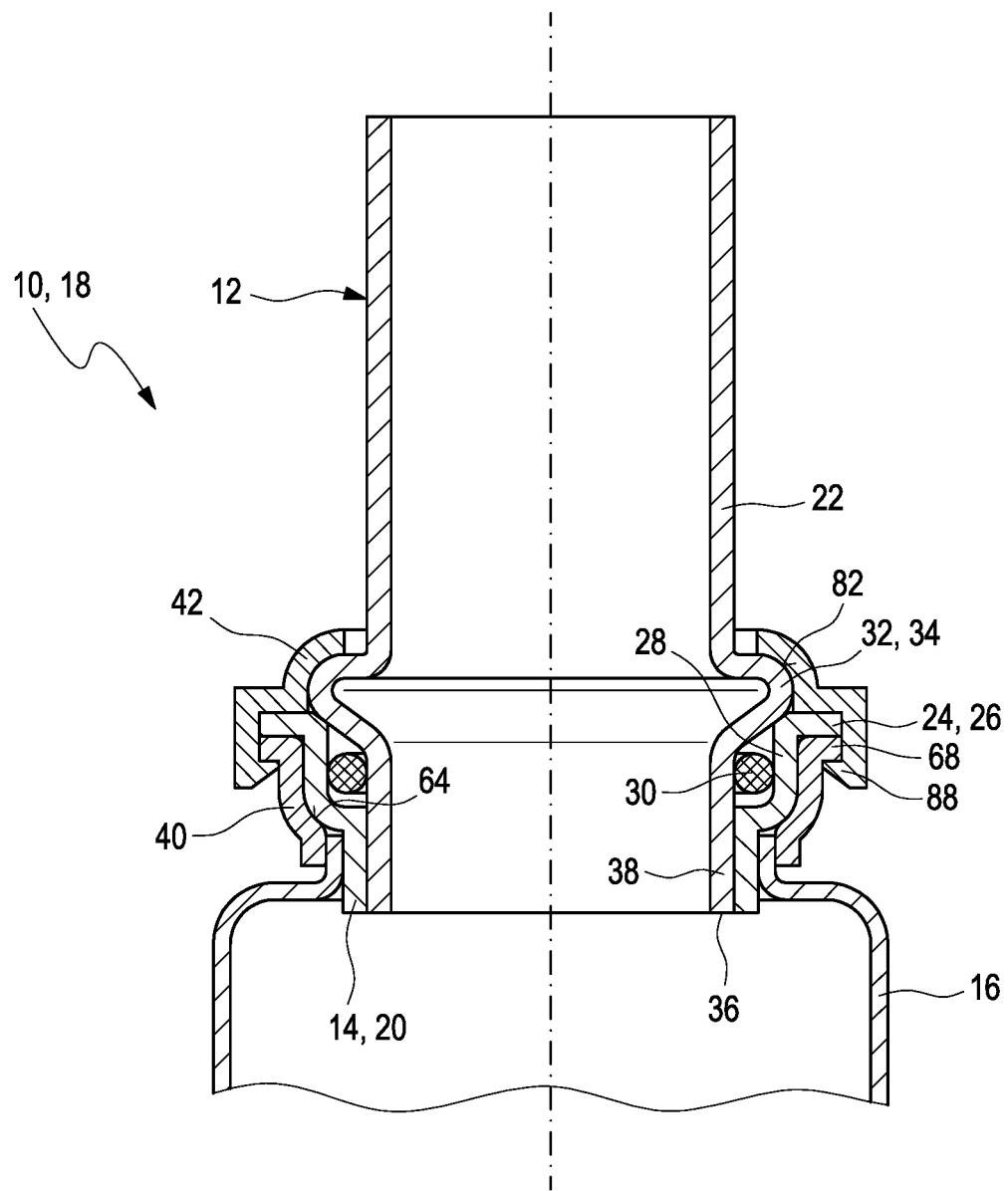

An embodiment of a pipe connection 10 represented in FIGS. 1 to 5 may be used for example to connect a pipe 12, for example a feeder pipe, to a pipe union 14 of a heat exchanger 16. Pipe connection 10 has a pipe connector 18 that connects a first pipe section 20 with a second pipe section 22. The first pipe section 20 corresponds to the pipe union 14 of heat exchanger 16, and the second pipe section 22 corresponds to the pipe 12.

The first pipe section 20 has a connection flange 24, which preferably has collar 26 extending in ring round the circumference thereof. The ring-shaped collar 26 is arranged on a free end of pipe section 20. A radially flared area 28 extends outwards from the ring-shaped collar 26 is designed to accommodate a sealing element 30.

Second pipe section 22 has a connection flange 32, which preferably has the form of an annular bead 34 and which is located at a distance from an end 36 of second pipe section 22. This forms a connecting piece 38 between annular bead 34 and end 36. Connecting piece 38 has a smaller outer diameter than the inner diameter of the first pipe section 20, so that connecting piece 38 can engage in first pipe section 20. Connection flange 32 of the second pipe section 22 then lies flush against connection flange 24 of the first pipe section 20. In particular, annular bead 34 lies flush against ring-shaped collar 26. This creates a cavity between the radially flared area 28 and connecting piece 38, in which sealing element 30 is arranged to seal first pipe section 20 off from second pipe section 22.

Pipe connector 18 has a lower motion link 40 and an upper motion link 42, which are retained so as to be pivotable towards each other about a pivot axis 44. A hinge 46 is preferably provided for this.

Lower motion link 40 has a seating 48 for first pipe section 20. Lower motion link 40 has one base section 50 and two legs 52 extending from the base section, and between them they delimit seating 48.

Seating 48 has a retention area 54, which is in the form of a circular segment, so that motion link 40 is able to lie flush against first pipe section 20 in the retention area 54.

Seating 48 further has an insertion area 56, which tapers from an insertion opening 58 opposite base section 50 to retention area 54. This has the effect of forming a kind of ramp 60. At its thinnest point, ramp 60 has a width that is smaller than the outer diameter of the first pipe section. In this way, ramp 60 forms a passable barrier, so that lower motion link 40 of pipe connector 18 can be pushed onto pipe section 20 in locking manner.

Seating 48 of lower motion link 40 defines an insertion direction 43 that is aligned at right angles to an axial direction 45 or plug-in direction 45, which is defined by the circular segment of retention area 54. The two pipe sections 20 and 22 are plugged into each other in plug-in direction 45 to connect pipe 12 to pipe union 14. The axial direction 45 in lower motion link 40 is substantially parallel to an axial direction of the first pipe section 20, which consequently may also be designated with reference number 45. Similarly, insertion direction 43 of lower motion link 40 is at right angles to the axial direction 45 of first pipe section 20 and at right angles to plug-in direction 45. Pivot axis 44 is aligned both at right angles to insertion direction 43 of lower motion link 40 and at right angles to axial direction 45 of first pipe section 20 and at right angles to plug-in direction 45.

Legs 52 have an inner contour 62 which define the shape of retention area 54 and of insertion area 56.

Legs 52 have a guide surface 64 that extends constant in the insertion direction, along which the first pipe section 20, particularly the radially flared area 28 of the first pipe section 20 can slide. Guide surface 64 is curved appropriately for this purpose. When pipe connector 18 is fitted on first pipe section 20, at least a part of guide surface 64 lies flush with radially flared area 28 of first pipe section 20.

Legs 52 also have a bearing surface 66 for connection flange 24 of the first pipe section 20. This means that the ring-shaped circumferential collar 26 of the first pipe section 20 lies flush with bearing surface 66 on legs 52 when pipe connector 18 is fitted on first pipe section 20. A shoulder or ridge is conformed between bearing surface 66 for connection flange 24 of the first pipe section 20 and guide surface 64, thereby separating guide surface 64 from bearing surface 66.

In addition, a mating detent contour 68 is conformed on an outer side of legs 52, and is able to cooperate with a detent contour 88 conformed on upper motion link 42.

Mating detent contour 68 is arranged lateral outwards and on an insertion end 70 of lower motion link 40, which faces base section 50. Mating detent contour 68 is preferably in the form of an undercut.

Upper motion link 42 has a seating 72 for the second pipe section 22. Upper motion link 42 also has one base section 74 and two legs 76 which delimit seating 72. An inner contour of legs 76 and of base section 74 defines a retention area 78, which is in the form of a circle segment and has an insertion area 80 with constant width.

The insertion direction of insertion area 80 on seating 72 of the upper motion link 42 extends substantially at right angles to pivot axis 44. When pipe connector 18 is open, insertion direction of the insert area 80 of the upper motion 42 link may occupy positions that differ from the insertion direction of the insertion area 56 of lower motion link 40. But when pipe connector 18 is closed, so that upper motion link 42 is lying flush with lower motion link 40, the insertion direction of the insertion area 80 of the upper motion link is parallel to the insertion direction of insertion area 56 of lower motion link 40.

Upper motion link 42 has a bearing surface 82 which is conformed on both legs 76 and base section 74. Consequently, bearing surface 82 surrounds the seating 72 for second pipe section 22. Bearing surface 82 is designed such that connection flange 32 of second pipe section 22 can lie flush with bearing surface 82. In particular, annular bead 34 of the second pipe section 22 can lie flush with bearing surface 82 of upper motion link 42. In order to create the largest possible bearing surface, bearing surface 82 is curved to match the shape of annular bead 34.

In addition, a flat surface 84 is formed on legs 76 and base section 74, and is separated from bearing surface 82 by a ridge 86. Ridge 86 extends in a U-shape.

Legs 76 further have a detent contour 88, which is shaped to complement the mating detent contour 68 of lower motion link 40. Detent contour 88 lies flush with an insertion end 90 of upper motion link 42, which is opposite base section 74. Additionally, detent contour 88 clasp at least part of lower motion link 40 laterally and from the outside, so that detent contour 88 reinforces lower motion link when pipe connector 18 is closed. Detent contour 88 is preferably in the form of a latching lug.

Legs 76 of upper motion link 42 have ribs 92 at insertion end 90, which extend transversely to the insertion direction of insertion area 80. Ribs 92 project from flat surface 84 and/or from bearing surface 82. In this way, ribs 92 block connection flange 24 of the first pipe section and connection flange 32 of the second pipe sections when pipe connector 18 is closed. And prevent the connection flanges from slipping out of the seating, when pipe connector 18 is closed.

When upper motion link 42 is pivoted towards lower motion link 40 about pivot axis 40 so that upper motion link 42 lies flush against lower motion link 40, a seating area 94 is created for both connection flanges 32 and 24, at least part of which area is delimited outwardly by ribs 92.

In order to create pipe connection 10, lower motion link 40 is fitted on first pipe section 20. To close pipe connector 18 and therewith also pipe connection 10, upper motion link 42 is pivoted about the pivot axis. This causes second pipe section 22 to move into seating 48. Since insertion area 56 has a constant width, it is simple to fold upper motion link 42 closed. When pipe connector 18 is pushed onto first pipe section 20 and sealed, accordingly connection flange 24 of the first pipe sections bears on bearing surface 66 and connection flange 32 of the second pipe section bears on bearing surface 82 of upper motion link 42, so that relative axial movement between the two pipe sections is prevented by means of connection flanges 24 and 32. When pipe connector 18 is closed and upper motion link 42 lies flush with lower motion link 40, bearing surface 66 of lower motion link 40 and bearing surface 82 of upper motion link 42 are aligned with each other so that both connection flanges 24 and 32 can be retained against one another in the axial direction in seating area 94.

An anti-slip arrangement 96 is also provided, and is intended to prevent the pipe connector 18 of the pipe sections from slipping out. Anti-slip arrangement 96 is formed at least on part by ramp 60 an lower motion link 40 in conjunction with the stiffening effect of upper motion link 42. Ribs 02 on the upper motion link 42 also serve as anti-slip arrangement 96.

The invention claimed is:

1. A pipe connector for connecting a first pipe section and a second pipe section, each of which has a connection flange, the pipe connector comprising:
    a lower motion link and an upper motion link, which are fastened so as to be pivotable towards each other about a pivot axis;
    wherein the lower motion link has a lower seating for one of the pipe sections;
    wherein the lower motion link has a bearing surface for the connection flange of the first pipe section;
    wherein the upper motion link has an upper seating for the other of the pipe sections;
    wherein the upper motion link has a bearing surface for the connection flange of the second pipe section;
    wherein the pivot axis is aligned substantially at right angles to an axial direction of the lower seating and of the upper seating for the pipe sections;
    wherein, in a closed state, the bearing surface of the lower motion link is facing the bearing surface of the upper motion link, so that the connection flanges of both pipe sections are able to be clasped; and
    wherein the lower motion link has one base section and two legs, which delimit the lower seating on three sides, and the upper motion link has one base section and two legs, which delimit the upper seating on three sides.

2. The pipe connector according to claim 1, wherein:
    the two legs of the lower motion link include the bearing surface for the connection flange of the first pipe section; and
    the bearing surface for the connection flange of the first pipe section is flat.

3. The pipe connector according to claim 1, wherein:
    the two legs of the upper motion link include the bearing surface for the connection flange of the second pipe section; and
    the bearing surface for the connection flange of the second pipe section is curved.

4. The pipe connector according to claim 1, wherein the upper motion link has ribs arranged on insertion ends of the two legs farthest from the pivot axis, the ribs extending transversely to an insertion direction of the upper seating.

5. The pipe connector according to claim 1, wherein:
    the two legs of the upper motion link each has a detent contour; and
    the two legs of the lower motion link each has a mating detent contour complementary to an associated detent contour, the mating detent contour engaging in a latching manner with the associated detent contour when the pipe connector is closed.

6. The pipe connector according to claim 5, wherein one of:
    each detent contour is a locking hook, and each mating detent contour is an undercut; or
    each detent contour is an undercut, and each mating detent contour is a locking hook.

7. The pipe connector according to claim 1, wherein:
    the lower seating has an insertion area and a retention area;
    the retention area of the lower seating is in the shape of a circular segment; and
    the insertion area of the lower seating has a width that decreases in a direction from an insertion opening to the retention area.

8. The pipe connector according to claim 1, wherein:
    the upper seating has an insertion area and a retention area;
    the retention area of the upper seating is in the shape of a circular segment; and
    the insertion area of the upper seating has a substantially constant width.

9. The pipe connector according to claim 1, wherein the pivot axis extends substantially at a right angle to an insertion direction of the lower seating.

10. The pipe connector according to claim 1, further comprising an anti-slip arrangement, which prevents the pipe connector from slipping radially off the pipe sections.

11. A pipe connection comprising:
    a first pipe section, which has a connection flange;
    a second pipe section, which has a connection flange that lies flush on the connection flange of the first pipe section; and
    a pipe connector connecting both pipe sections, the pipe connector including a lower motion link and an upper motion link, which are fastened so as to be pivotable towards each other about a pivot axis;
    wherein the lower motion link has a lower seating for one of the pipe sections;
    wherein the lower motion link has a bearing surface for the connection flange of the first pipe section;
    wherein the upper motion link has an upper seating for the other of the pipe sections;
    wherein the upper motion link has a bearing surface for the connection flange of the second pipe section;
    wherein the pivot axis is aligned substantially at right angles to an axial direction of the lower seating and of the upper seating for the pipe sections;
    wherein, in a closed state, the bearing surface of the lower motion link is facing the bearing surface of the upper motion link, so that the connection flanges of both pipe sections are able to be clasped;

wherein the bearing surface for the connection flange of the first pipe section lies flush on the connection flange of the first pipe section; and wherein the bearing surface for the connection flange of the second pipe section lies flush on the connection flange of the second pipe section, so that the pipe connector holds both connection flanges together.

12. The pipe connection according to claim 11, wherein:
the connection flange of the first pipe section is in the form of a protruding, circumferential collar; and
the connection flange of the second pipe section is in the form of an annular bead.

13. The pipe connection according to claim 12, wherein the annular bead is located at a distance from one end of the second pipe section.

14. The pipe connection according to claim 11, wherein:
the lower motion link has one base section and two legs, which delimit the lower seating on three sides; and
the upper motion link has one base section and two legs, which delimit the upper seating on three sides.

15. The pipe connection according to claim 14, wherein:
the two legs of the lower motion link include the bearing surface for the connection flange of the first pipe section; and
the bearing surface for the connection flange of the first pipe section is flat.

16. The pipe connection according to claim 14, wherein:
the two legs of the upper motion link include the bearing surface for the connection flange of the second pipe section; and
the bearing surface for the connection flange of the second pipe section is curved.

17. The pipe connection according to claim 14, wherein the upper motion link has ribs arranged on insertion ends of the two legs farthest from the pivot axis, the ribs extending transversely to an insertion direction of the upper seating.

18. The pipe connection according to claim 14, wherein:
the two legs of the upper motion link each has a detent contour; and
the two legs of the lower motion link each has a mating detent contour complementary to an associated detent contour, the mating detent contour engaging in a latching manner with the associated detent contour when the pipe connector is closed.

19. A heat exchanger comprising a pipe union, a pipe connected to the pipe union by a pipe connection having:
a first pipe section, which has a connection flange;
a second pipe section, which has a connection flange that lies flush on the connection flange of the first pipe section; and a pipe connector connecting both pipe sections, the pipe connector including a lower motion link and an upper motion link, which are fastened so as to be pivotable towards each other about a pivot axis;

wherein the lower motion link has a lower seating for one of the pipe sections;

wherein the lower motion link has a bearing surface for the connection flange of the first pipe section;

wherein the upper motion link has an upper seating for the other of the pipe sections;

wherein the upper motion link has a bearing surface for the connection flange of the second pipe section;

wherein the pivot axis is aligned substantially at right angles to an axial direction of the lower seating and of the upper seating for the pipe sections;

wherein, in a closed state, the bearing surface of the lower motion link is facing the bearing surface of the upper motion link, so that the connection flanges of both pipe sections are able to be clasped;

wherein the bearing surface for the connection flange of the first pipe section lies flush on the connection flange of the first pipe section; and wherein the bearing surface for the connection flange of the second pipe section lies flush on the connection flange of the second pipe section, so that the pipe connector holds both connection flanges together.

20. A pipe connector for connecting a first pipe section and a second pipe section, each of which has a connection flange, the pipe connector comprising:
a lower motion link and an upper motion link, which are fastened so as to be pivotable towards each other about a pivot axis;

wherein the lower motion link has a lower seating for one of the pipe sections;

wherein the lower motion link has a bearing surface for the connection flange of the first pipe section;

wherein the upper motion link has an upper seating for the other of the pipe sections;

wherein the upper motion link has a bearing surface for the connection flange of the second pipe section;

wherein the pivot axis is aligned substantially at right angles to an axial direction of the lower seating and of the upper seating for the pipe sections;

wherein, in a closed state, the bearing surface of the lower motion link is facing the bearing surface of the upper motion link, so that the connection flanges of both pipe sections are able to be clasped; and wherein the lower seating has an insertion area and a retention area, the insertion area having a width that decreases in a direction from an insertion opening to the retention area, and the retention area being in the shape of a circular segment.

* * * * *